(12) United States Patent
Jeong et al.

(10) Patent No.: US 7,411,627 B2
(45) Date of Patent: Aug. 12, 2008

(54) BIAXIALLY ROTATABLE CAMERA LENS MODULE

(75) Inventors: Byeong-Ro Jeong, Seoul (KR); Yong-Jin Lee, Kyonggi-do (KR)

(73) Assignee: Samsung Electronics Co., Ltd (KR)

( * ) Notice: Subject to any disclaimer, the term of this patent is extended or adjusted under 35 U.S.C. 154(b) by 798 days.

(21) Appl. No.: 10/691,732

(22) Filed: Oct. 23, 2003

(65) Prior Publication Data
US 2004/0080667 A1   Apr. 29, 2004

(30) Foreign Application Priority Data
Oct. 23, 2002   (KR)   .................... 10-2002-0064967

(51) Int. Cl.
*H04N 5/225* (2006.01)
(52) U.S. Cl. .................... 348/374; 348/335; 455/575.3
(58) Field of Classification Search ................. 548/335, 548/373–375, 14.01–14.03
See application file for complete search history.

(56) References Cited

U.S. PATENT DOCUMENTS

| 4,163,613 | A | * | 8/1979 | Smart | 396/144 |
| 5,414,444 | A | | 5/1995 | Britz | |
| 5,701,532 | A | * | 12/1997 | Inaba | 396/326 |
| 5,715,138 | A | | 2/1998 | Choi | |
| 5,903,706 | A | * | 5/1999 | Wakabayashi et al. | 348/373 |
| 5,930,544 | A | * | 7/1999 | Tseng et al. | 348/374 |
| 6,532,035 | B1 | * | 3/2003 | Saari et al. | 348/14.02 |
| 6,865,406 | B2 | * | 3/2005 | Park | 455/575.3 |

FOREIGN PATENT DOCUMENTS

| CN | 2328030 | 7/1999 |
| EP | 0 898 405 | 2/1999 |

\* cited by examiner

*Primary Examiner*—Lin Ye
*Assistant Examiner*—Gevell Selby
(74) *Attorney, Agent, or Firm*—The Farrell Law Firm, PC

(57) ABSTRACT

Disclosed is a biaxially rotatable camera lens module. The module comprises a cylindrical lens housing with a lens, a first axial rotatable dial mounted on one end of the cylindrical lens housing and rotating the lens about a first pivot axis, a second axial rotatable dial mounted on the other end of the cylindrical lens housing and rotating the lens within a predetermined angle about a second pivot axis perpendicular to the first pivot axis, a gear mechanism for transforming a rotating motion of the second axial rotatable dial into a linear motion, and a cam mechanism for transforming a linear motion of the gear mechanism into a rotating motion and rotating the lens about the first pivot axis.

6 Claims, 4 Drawing Sheets

BIAXIALLY ROTATABLE CAMERA LENS MODULE

PRIORITY

This application claims priority to an application entitled "Biaxially Rotatable Camera Lens Module" filed in the Korean Industrial Property Office on Oct. 23, 2002 and assigned Serial No. 2002-64967, the contents of which are hereby incorporated by reference.

BACKGROUND OF THE INVENTION

1. Field of the Invention

The present invention relates to a camera lens module for a portable terminal capable of performing video conversation or communication, or for photographing a desired object, and more particularly to a camera lens module capable of rotating in two axial directions, i.e. in vertical and horizontal directions.

2. Description of the Related Art

Typically, a "portable terminal" means a lightweight, small, portable device that it is capable of providing telecommunication services to a user who is either stationary or in motion so as to perform wireless communication with a corresponding partner. Such wireless communication may be voice, image, or Internet communication. The portable terminals are classified into various types, for example, a bar type, flip type or folder type, based on its geometry. The bar type portable terminal constitutes a single housing which takes a bar shape. The folder type portable terminal has a folder is pivotably coupled to a single bar-shaped housing by a hinge so as to make the terminal foldable.

Further, the portable terminal may be classified into a neck wearable type or a wrist wearable type based on a use position or the way in which the user puts it on. The neck wearable type portable terminal is worn around the user's neck using a string, while the wrist wearable type portable terminal is worn around the user's wrist.

Also, the portable terminal may be classified into a rotation type or a sliding type based on the manner in which the terminal is opened or closed. The rotation type portable terminal has two housings coupled to each other in such a manner that one housing is capable of being rotatably opened or closed with respect to the other. The sliding type portable terminal has two housings coupled to each other in such a manner that one housing is capable of being slidably opened or closed with respect to the other along in a longitudinal direction. The foregoing various types of potable terminals are easily understood by those skilled in the art.

Meanwhile, all the aforementioned conventional portable terminals are essentially provided with a data input unit and a data output unit. Of course, the data input unit typically employs a key pad with a plurality of keys, by which data is input by pushing a key down with at least one finger. This may also be true for a touch pad or a touch screen. Moreover, the data output unit generally makes use of a liquid crystal display (LCD).

Typically, the key pad for inputting data consists of an array of a plurality of keys. These keys include numeral keys, character keys, sending keys, end key, functional keys, and so forth. In addition, the keys, typically ranging in number from 15 to 20, are generally placed on the top surface of the housing of the portable terminal. The keys are exposed on the top surface the portable terminal so that the user can push them with at least one finger to input desired data.

In addition, to perform video conversation or communication with the corresponding partner or to photograph a desired object, a camera lens module is mounted on a main housing of the potable terminal. Such a camera lens module is mounted in a rotatable fashion rather than in a fixed fashion at a predetermined position of the main housing so that the user can conveniently operate the camera lens module. To this end, a housing of the camera lens module is provided with a rotatable dial which is rotatably coupled to the housing.

However, in the conventional portable terminal, the camera lens module is generally designed to be rotatable in one direction. Therefore, the user meets with inconvenienced when performing video conversation or communication, or when photographing a desired object. That is to say, because the conventional portable terminal, in particular the folder type portable terminal, maintains an unfolded angle between the folder and the housing of about 135 degrees, at the appropriate angle for conversation, rather than of 180 degrees, the user has difficulty in photographing his/her own appearance or others facing toward the display screen of the portable terminal.

To solve this drawback, a portable terminal has been designed to rotate the display screen along with the entire folder. This portable terminal, however, has a drawback in that the user has to rotate the entire folder, making it inconvenient to use the display screen and other components located on the folder. Moreover, the conventional camera lens module makes it impossible to control a precise rotation angle, thus demanding an inconvenient photographing pose from the user or demanding a change in the position of the display screen.

SUMMARY OF THE INVENTION

Accordingly, the present invention has been made to solve the above-mentioned problems occurring in the prior art, and an object of the present invention is to provide a biaxially rotatable camera lens module capable of rotating in two axial directions, particularly, about an X axis and a Y axis.

It is another object of the present invention to provide a biaxially rotatable camera lens module capable of rotating about the Y axis within a predetermined angle by using a gear mechanism and a cam mechanism.

It is yet another object of the present invention to provide a biaxially rotatable camera lens module capable of easily performing video conversation or communication with a corresponding partner or photographing a desired object.

In order to accomplish these objects, there is provided a biaxially rotatable camera lens module, comprising: a cylindrical lens housing with a lens; a first axial rotatable dial, mounted on one end of the cylindrical lens housing, for rotating the lens about a first pivot axis; a second axial rotatable dial, mounted on the other end of the cylindrical lens housing, for rotating the lens about a second pivot axis perpendicular to the first pivot axis within a predetermined angle; a gear mechanism for transforming a rotating motion of the second axial rotatable dial into a linear motion; and a cam mechanism for transforming a linear motion of the gear mechanism into a rotating motion and rotating the lens about the first pivot axis.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings. The following description of the present invention omits details of known functions and configurations to avoid making the subject matter of the present invention unclear.

Figure 1:
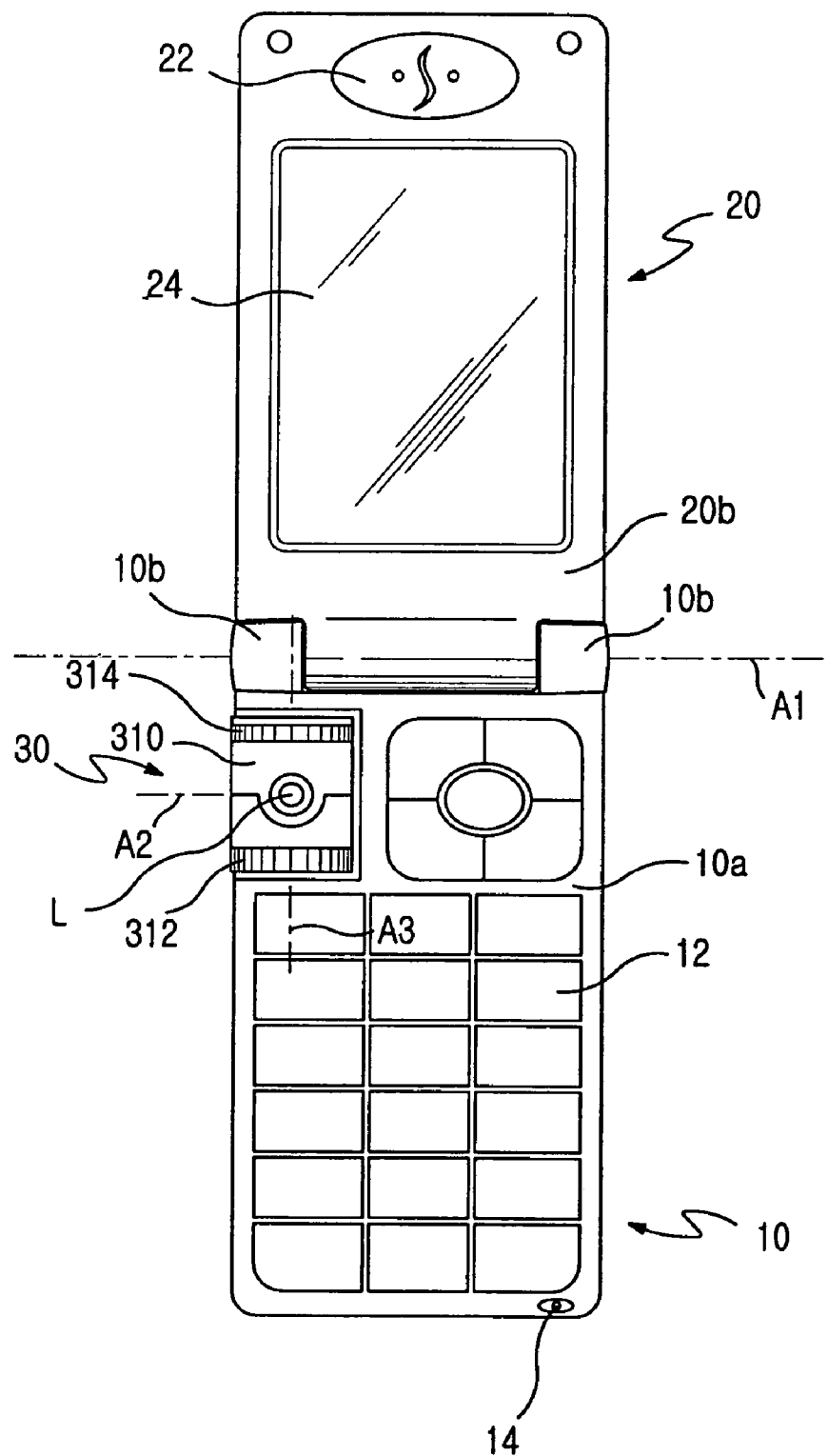
FIG. 1 is a plan view of a portable terminal employing a camera lens module according to a preferred embodiment of the present invention, with a folder opened relative to a main housing.

As shown in FIG. 1, a portable terminal employing a biaxially rotatable camera lens module according to the present invention comprises a main housing 10, a folder 20 connected to the main housing in a foldable manner, and a hinge for joining the main housing 10 with the folder 20 to be rotatable about a hinge axis A1 thereof, and a camera lens module 30 mounted at a predetermined position on the main housing 10 so as to be rotatable about two axes, A2 and A3. These two axes constitues an X axis corresponding to a first pivot axis A2 and a Y axis corresponding to a second pivot axis A3.

That is, the camera lens module 30 is designed to be rotatable about the X axis as well as about the Y axis. It should be noted that even though the camera lens module 30 is mounted at the predetermined position on the main housing (i.e. on the left upper portion of the main housing in FIG. 1), it may be mounted either on the right upper portion of the main housing 10 or at another predetermined position, such as on the folder 20.

The main housing 10 is provided with a plurality of keys 12 and a microphone 14. At the predetermined position, specifically at a position adjacent to one of a pair of male arms 10b of the hinge which is provided on the main housing 10, the biaxially rotatable camera lens module 30 is provided. The camera lens module 30 rotates about the X and Y axes. Specifically, the camera lens module 30 is capable of rotating about the first pivot axis A2 within a first predetermined angle as well as about the second pivot axis A3 within a second predetermined angle. The first predetermined angle ranges from about 0 to 150 degrees, while the second predetermined angle ranges from about 0 to 30 degrees.

The folder 20 includes a speaker 22 on its inner surface and a liquid crystal display (LCD) 24 positioned near the speaker. The inner surface of the folder is a surface opposite to the camera lens module when the folder is closed toward the main housing.

The camera lens module 30 includes a cylindrical lens housing 310, an X axial rotatable dial 312 mounted on one end of the lens housing 310, and a Y axial rotatable dial 314 mounted on the other end opposite to and spaced from the one end of the lens housing 310 apart at a predetermined distance. Further, the X and Y axial rotatable dials 312 and 314 are mounted so as to be exposed to the exterior, together with a lens L.

Figure 2:
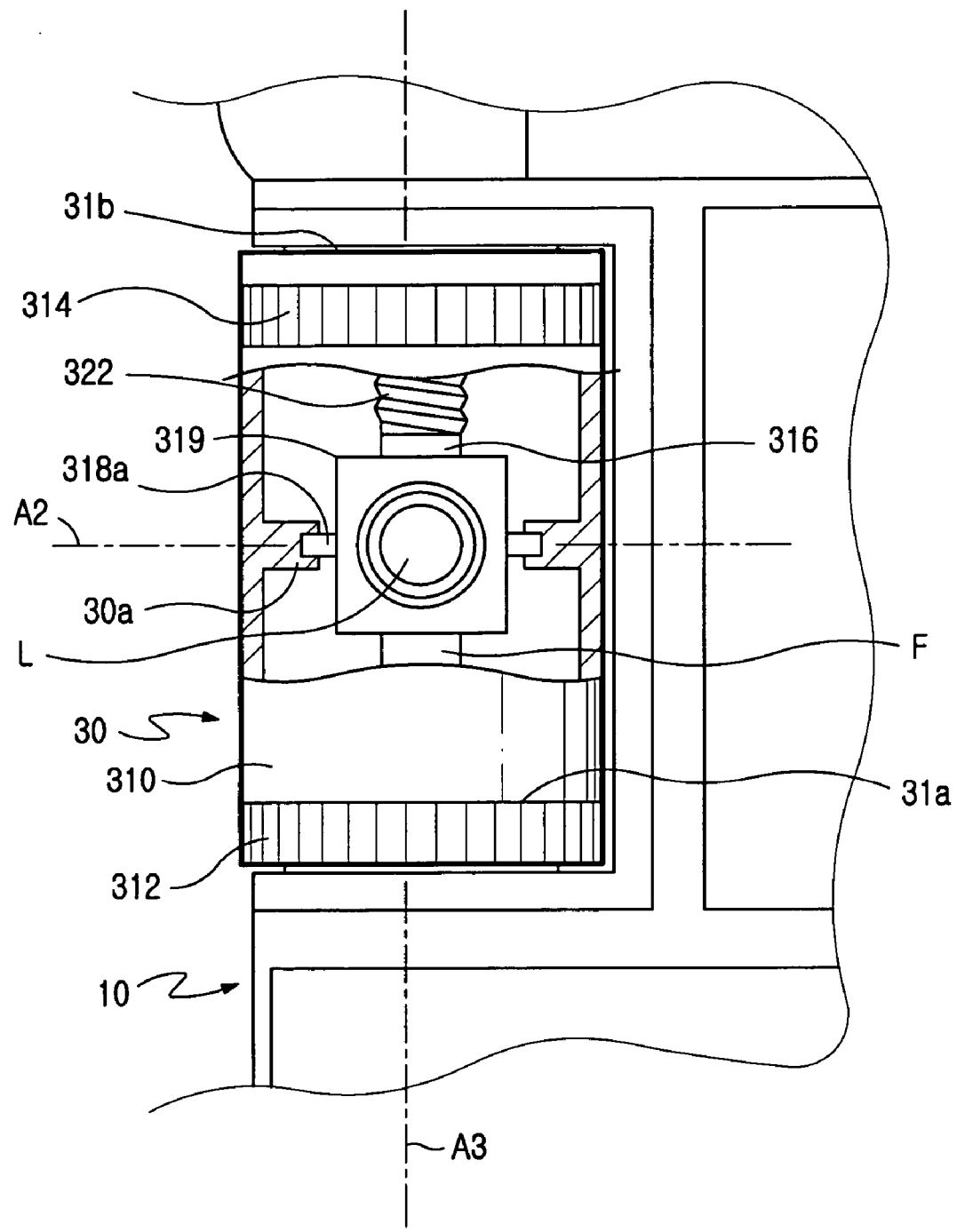
FIG. 2 is an enlarged, detailed, partial cut-away plan view of a biaxially rotatable camera lens module according to a preferred embodiment of the present invention.
Figure 3:
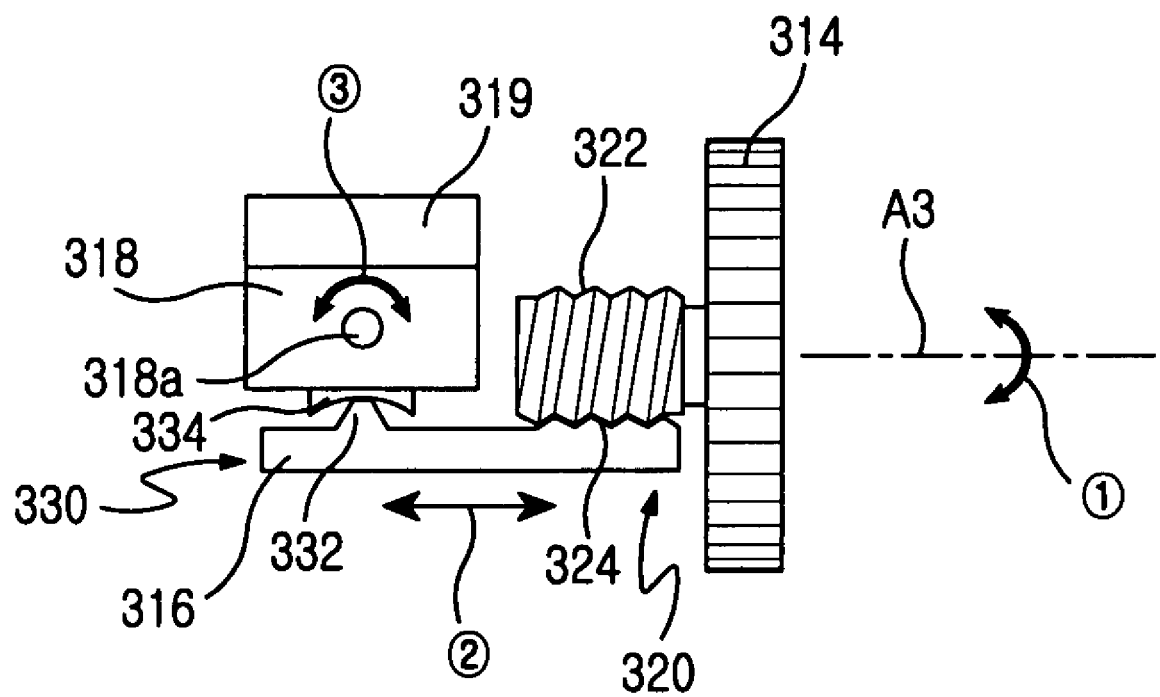
FIG. 3 shows an internal configuration of the biaxially rotatable camera lens module according to the preferred embodiment of the present invention.

Configuration of the biaxially rotatable camera lens module 30 according to the invention will be described below with reference to FIGS. 2 and 3. As shown in FIGS. 2 and 3, the module 30 makes use of a gear mechanism 320 and a cam mechanism 330 so as to rotate a lens frame 319 about two axes. The gear mechanism 320 transforms a rotating motion of the Y axial rotatable dial 314 into a linear motion of a rack 316. The cam mechanism 330 transforms the linear motion of the rack 316 into a rotating motion of the lens frame 319.

The gear mechanism 320 includes a first gear 322 extending along a central rotating axis of the Y axial rotatable dial 314 or along the second pivot axis A3, and a second gear 324 causing the rack 316 to move linearly in engagement with the first gear 322. The cam mechanism 330 includes a first cam 332 provided on one end, opposite to the second gear 324, of the rack 316 and a second cam 334 rotating a cam body 318 about the first pivot axis A2. The first cam 332 is provided on one end of the rack 316 and the second gear 324 is provided on the other end of the rack 316. The second cam 334 is provided on a bottom of the cam body 318.

Preferably, the first cam 332 has a convex shape, while the second cam 334 has a concave shape. Each of the first and second cams 332 and 334 has a sliding cam surface with a predetermined curvature.

The cam body 318 and the lens frame 319 are integrally connected with each other. The cam body 31 preferably includes at least one protrusion 318a extending along the first pivot axis.

Further, a flexible printed circuit board (FPCB) F, which is connected to the lens frame 319 shown in FIG. 2, extends to a main PCB, not shown, of the main housing 10 along the second pivot axis A3.

Figure 4A:
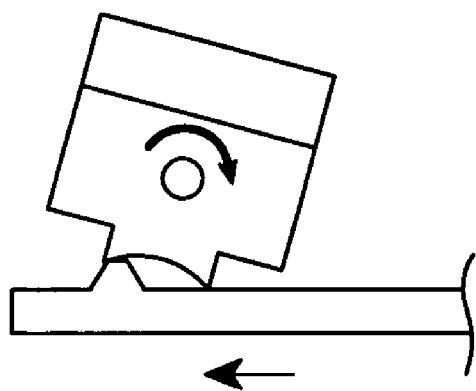
FIGS. 4A and 4B show the operation of the biaxially rotatable camera lens module according to the preferred embodiment of the present invention.
Figure 4B:
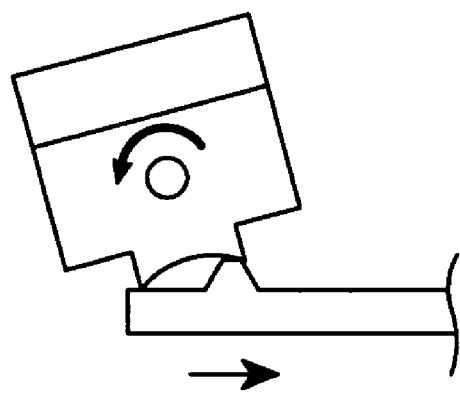

As shown in FIGS. 3, 4a and 4b, when the Y axial rotatable dial 314 rotates in a direction of an arrow ①, the first gear 322 also rotates in the same direction as the Y axial rotatable dial. Next, the second gear 324 engaged with the first gear 322 moves linearly in a direction of an arrow ②, and at the same time the first cam 332 also performs a linear movement. Subsequently, the second cam 334 engaged on the first cam 332 performs a sliding movement relative to the first cam 332 and rotates about the first pivot axis A2. These sequential operations occur almost simultaneously.

As seen from the foregoing, the biaxially roatable camera lens module according to the invention is designed to be rotatable in two directions and to be freely movable, depending on the position of an object to be photographed, so that the user can obtain a desired image without incurring inconvenience.

While the invention has been shown and described with reference to certain preferred embodiments thereof, it will be understood by one skilled in the art that various modifications may be made therein without departing from the spirit and scope of the invention as defined by the appended claims. It should be noted that the biaxially roatable camera lens module according to the invention does not need to be limited to the folder-type portable terminal, so that it is possible to be applied to all portable electronic equipments for taking a picture.

What is claimed is:

1. A biaxially rotatable camera lens module, comprising;
   a cylindrical lens housing extending in a longitudinal direction and having a lens mounted in the longitudinal direction;
   an X axial rotatable dial rotating the lens left and right about an A3 pivot axis;

a Y axial rotatable dial rotating the lens up and down within a predetermined angle about an A2 pivot axis perpendicular to the A3 pivot axis;

a gear mechanism for transforming a first rotating motion of the Y axial rotatable dial into a linear motion; and a cam mechanism for transforming the linear motion of the gear mechanism into a second rotating motion and rotating the lens about the A2 pivot axis, both the X and Y axial rotatable dials being mounted in the longitudinal direction of the cylindrical lens housing.

2. The biaxially rotatable camera lens module according to claim 1, wherein the gear mechanism comprises a first gear extending along a central rotating axis of the Y axial rotatable dial, and a second gear causing a rack of the gear mechanism to move linearly in engagement with the first gear.

3. The biaxially rotatable camera lens module according to claim 1, wherein the cam mechanism comprises a first cam convexly shaped for cooperating with the linear motion, and a second cam concavely shaped for rotating the lens about the A2 pivot axis during a sliding linear movement while being in contact with the first cam.

4. The biaxially rotatable camera lens module according to claim 1, wherein the lens further comprises a cam body with which the cam mechanism is integrally connected.

5. The biaxially rotatable camera lens module according to claim 4, wherein the cam body is formed with a protrusion extending along the A2 pivot axis.

6. The biaxially rotatable camera lens module according to claim 1, wherein the A2 pivot axis extends in a horizontal direction, and the A3 pivot axis extends in a vertical direction.

* * * * *